Oct. 18, 1960  E. DOMEIER  2,957,061
STATIC RELAY APPARATUS
Filed July 24, 1958  5 Sheets-Sheet 1

INVENTOR.
EDUARD DOMEIER
BY
Donnelly, Inzenlag & Harrington
ATTORNEYS

Oct. 18, 1960

E. DOMEIER 2,957,061

STATIC RELAY APPARATUS

Filed July 24, 1958

INVENTOR.
EDUARD DOMEIER
BY
Donnelly, Inzentag & Harrington
ATTORNEYS

Oct. 18, 1960  E. DOMEIER  2,957,061
STATIC RELAY APPARATUS
Filed July 24, 1958  5 Sheets-Sheet 3

INVENTOR.
EDUARD DOMEIER
BY
ATTORNEYS

Oct. 18, 1960   E. DOMEIER   2,957,061
STATIC RELAY APPARATUS
Filed July 24, 1958   5 Sheets-Sheet 4

INVENTOR.
EDUARD DOMEIER
BY
Donnelly, Mentag & Harrington
ATTORNEYS

United States Patent Office 2,957,061
Patented Oct. 18, 1960

2,957,061

STATIC RELAY APPARATUS

Eduard Domeier, Maybee, Mich., assignor, by direct and mesne assignments, of one-fourth to James E. Croushore, Birmingham, and one-fourth to Frank A. McBride, Detroit, Mich.

Filed July 24, 1958, Ser. No. 750,605

8 Claims. (Cl. 200—87)

This invention relates to improvements in electrical relays, and, more particularly, to electrical relays of the electrostatic type.

It is an important object of this invention to provide an electrostatic relay which is adapted to function as a highly sensitive switching measuring device and which consumes only a minimum amount of energy for operation purposes.

It is another object of this invention to provide an electrostatic relay which functions as a condenser and is operable in air, a vacuum, or in an insulating fluid, and which includes a pair of spaced apart electroconductive means and a movably mounted switching means adapted to be moved in one direction in response to an electrical field between said electroconductive means, and which further includes a magnetic return device to provide a snap return action to said switching means when it moves in the other direction.

It is another object of this invention to provide an electrostatic relay which functions as a condenser, and which incorporates a fixed electroconductive means spaced apart from an adjustably mounted electroconductive means and having a movably mounted switching means positioned between said electroconductive means which is responsive to an electrical field between said electroconductive means and to a magnetic return device, whereby said switching means will be urged in a predetermined direction to open and/or close electric contacts in a circuit to be controlled by the relay.

It is a further object of this invention to provide an electrostatic relay which is adapted to function on direct, alternating or high frequency currents.

It is a further object of this invention to provide an electrostatic relay which embodies a small highly insulated condenser having an extremely high internal resistance, whereby it is capable of operating with practically no energy consumption.

It is a still further object of this invention to provide an electrostatic relay which can be used to measure extremely small currents or function as a switching or control element in a circuit.

It is another object of this invention to provide an electrostatic relay which is simple and rugged in construction, efficient in operation, economical of manufacture, and adapted for a wide variety of uses.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 10 is an enlarged elevational view, with parts broken away and parts in section, of the contact carrier assembly employed in the embodiment of Figs. 7, 8 and 9; and, Fig. 11 is a fragmentary elevational sectional view of the structure illustrated in Fig. 10, taken along the line 11—11 thereof, and looking in the direction of the arrows.

Figure 1:
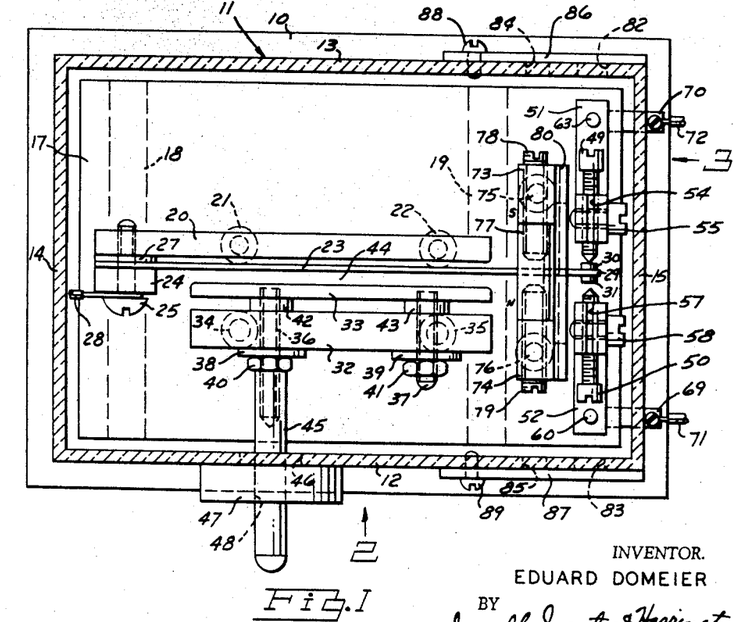
Fig. 1 is a top plan view of a first electrostatic relay embodying the invention, taken along the line 1—1 of Fig. 2, and looking in the direction of the arrows.
Figure 2:
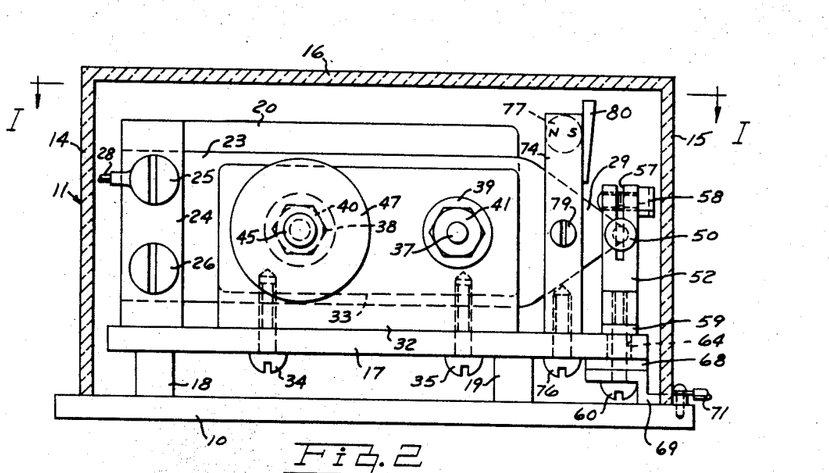
Fig. 2 is a left side elevational view of the structure illustrated in Fig. 1, taken in the direction of the arrow marked 2, and with the side of the transparent cover removed.
Figure 3:
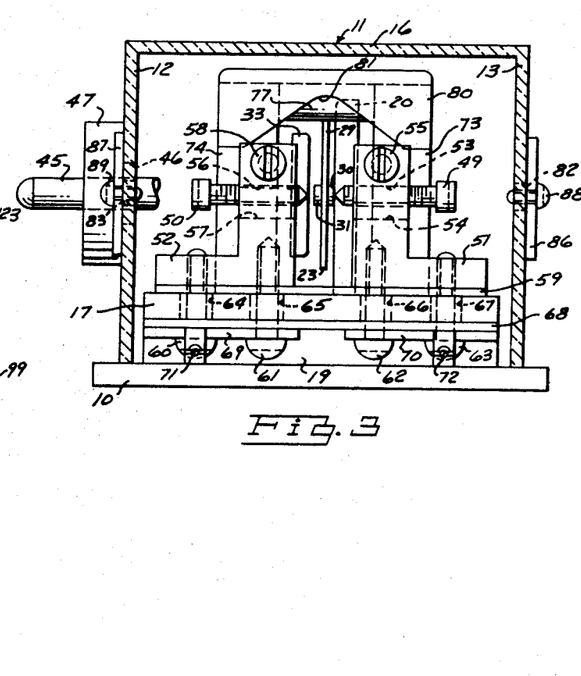
Fig. 3 is a front end elevational view of the structure illustrated in Fig. 1, taken in the direction of the arrow marked 3, and with the end of the transparent cover removed.

Referring now to the drawings, and in particular to Figs. 1, 2 and 3 wherein is shown a first electrostatic relay embodying the principles of the invention, the numeral 10 indicates a supporting member or board made from a suitable non-conductive material. Fixedly mounted on the supporting board 10, by any suitable means, is an integral transparent dust-proof cover, generally indicated by the numeral 11, which is adapted to enclose the relay. The cover 11 may be made from any suitable transparent material, as for example, a transparent plastic material. The cover 11 includes the side walls 12 and 13, the end walls 14 and 15, and, the top wall 16.

The relay shown in Figs. 1, 2 and 3 is adapted to operate in air and includes the grounded non-magnetic metal base plate 17 which is fixedly supported on the supporting board 10 by any suitable means as by the transverse non-conductive legs 18 and 19. The reference numeral 20 indicates a fixedly mounted counter electrode or electroconductive plate which is substantially rectangular in shape and is disposed on a side edge thereof and longitudinally of the base plate 17. The fixedly mounted plate 20 is secured to the base plate 17 by means of the screws 21 and 22, as shown in Fig. 1. A movably mounted metal or electroconductive switching plate 23 is fixedly mounted at the rear end thereof to the rear end of the fixed plate 20 by means of the vertical retainer strip 24 and the screws 25 and 26. The retainer strip 24 is formed from a suitable electroconductive material. The switching plate 23 is connected to the fixed plate 20 by means of the spacer or positioning plate 27 which is also made from a suitable electroconductive material. The switching plate 23 is preferably fully or partially made of a ferro-magnetic material with small coercive force such as silicon iron or mu-metal and to a thickness of .35 mm. The spacer plate 27 is preferably .05 mm. thick. The fixed plate 20 and the switching plate 23 are adapted to be grounded or charged with a voltage through any suitable means as by the electrical conductor or lead line 28. The fixed plate 20 and the switching plate 23 may also be grounded or charged through the grounded metal base plate 17 through suitable conductors connected to the base plate 17. The front end of the switching plate 23 is provided with a pointed nose 29 which extends forwardly beyond the front end of the fixed plate 20 and which carries the fixedly mounted electrical contacts 30 and 31 on the opposite sides thereof.

As shown in Figs. 1, 2 and 3, a rectangularly spaced vertically disposed carrier member 32 made from a non-conductive material is provided to carry the adjustably mounted controlling or actuating electrode or electroconductive plate 33. The carrier member 32 is fixedly secured to the base plate 17 by means of the screws 34 and 35. The plate 33 is highly insulated and is adjustably carried by the carrier member 32 by means of the adjusting screws 36 and 37. As best seen in Fig. 1, the inner ends of the screws 36 and 37 are threaded into the controlling plate 33 and these screws pass through suitable apertures in the carrier member 32. Mounted on the outer ends of the screws 36 and 37 are the non-conductive washers 38 and 39 and the lock nuts 40 and 41, respectively. Mounted on the screws 36 and 37 between the carrier member 32 and the controlling plate 33 are the compressible non-conductive spacing washers 42 and 43, respectively. It will be seen that the controlling plate 33 may be moved laterally relative to the stationary or fixed metal plate 20 by turning the nuts 40 and 41 as desired to move the screws 36 and 37 relative to the carrier member 32. The air gap 44 between the switching plate 23 and the controlling plate 33 can thus be adjusted depending on the desired range of application. For example, if the charging voltage between the plates 20 and 33 is to be approximately 1000 volts, then the air gap or spacing distance 44 would be set for about .3 mm. The controlling plate 33 may be connected to the charging voltage by any suitable means as, for example, by the electrical conductor rod 45 which has the inner end thereof threadably mounted on the outer extended end of the adjusting screw 36. The outer end of the conductor rod 45 extends outwardly of the transparent dust cover 11 through a suitable aperture as 46 in the side wall 12. An insulating washer 47 provided with the central hole 48 is slidably mounted around the outer end of the conductor rod 45 for insulating purposes.

As best seen in Figs. 1 and 3, the contacts 30 and 31 on the switching plate 23 are disposed between the two adjustable contact screws 49 and 50. The contact 30 on the switching arm 23 is adapted to normally rest against and engage the contact screw 49 when the switching plate 23 is in the position shown in Figs. 1 and 3. The contact 31 on the switching plate 23 is adapted to engage the contact screw 50 when the switching plate 23 is attracted to the controlling plate or electrode 33, as more fully described hereinafter. As best seen in Figs. 1 and 3, the contact screws 49 and 50 are adjustably mounted in the L-shaped supporting members 51 and 52, respectively. The contact screw 49 is threadably mounted in the horizontal aperture 53 formed in the vertical portion of the L-shaped supporting member 51. A vertical slot 54 is formed in the upper end of the vertical portion of the L-shaped supporting member 51 and communicates with the threaded aperture 53. The contact screw 49 may be clamped in an adjusted position by means of the clamping screw 55 which is threadably mounted through the upper end of the vertical portion of the L-shaped member 51. The contact screw 50 is similarly mounted in the threaded aperture 56 in the L-shaped supporting member 52 which is also provided with a similar vertical slot 57 and a similar clamping screw 58.

The L-shaped contact screw supporting members 51 and 52 rest on the front end of the base plate 17 and are insulated therefrom by means of the interposed strip of insulating material 59, and are fixedly secured thereto by means of the screws 60, 61, 62 and 63 which pass through the enlarged holes 64, 65, 66 and 67, respectively, in the plate 17. A second strip of insulating material 68 is disposed between the bottom surface of the base plate 17 and the screws 60, 61, 62 and 63. The screws 60 and 61 fixedly hold the conductor terminal bracket 69 on the lower side of the insulating strip 68, and the screws 62 and 63 fixedly hold a similar conductor terminal bracket 70 on the lower side of the insulating strip 68. The contact screw 50 is thus electrically connected to the terminal bracket 69 by means of the screws 60 and 61, and, the contact screw 49 is electrically connected to the terminal bracket 70 by means of the screws 62 and 63. The terminal brackets 69 and 70 are adapted to be connected by suitable conductors as 71 and 72, respectively, in a circuit to be controlled by the relay.

The relay is provided with a magnetic return device which includes the two spaced apart vertical magnet metal support bars 73 and 74 which are disposed on opposite sides of the switch plate 23 between the plates 20 and 33 and the contacts 30 and 31. The magnet support bars 73 and 74 are fixedly secured to the non-magnetic base plate 17 by means of the screws 75 and 76. Fixedly mounted between the upper ends of the bars 73 and 74, by any suitable means, is a permanent bar magnet 77. Threadably mounted through the bars 73 and 74 are the horizontal adjustable screws 78 and 79, respectively, which function as adjustable magnetic poles and which are disposed transversely to the switching plate 23. As best seen in Fig. 1, the inner ends of the screw poles 78 and 79 are spaced apart from the switching plate 23 and function as described hereinafter. The magnetic force of the magnet 77 may be adjusted by means of the magnetic variable metal shunt 80 which is wedge shaped in cross-section and is provided with a V-shaped cut-out or recess 81 on the lower side thereof. The magnetic force of the magnet 77 may be adjusted to the electrostatic forces of the relay by moving the shunt 80 upwardly or downwardly, as desired, to decrease or increase, respectively, the magnetic force on the switching plate 23. The shunt 80 is, of course, held on the magnet 77 by magnetic attraction.

The side walls of the dust cover 11 are provided with the holes 82 and 83 to permit adjustment of the contact screws 49 and 50, respectively, and with the holes 84 and 85 to permit inward and outward adjustment of the pole screws 78 and 79, respectively, without removing the cover. These adjustment holes are adapted to be normally covered by the cover plates 86 and 87 which are pivotally mounted at one end thereof by means of the screws 88 and 89, respectively.

In use, the fixed plate 20 and the switching plate 23 are grounded through any suitable means, as the conductor 28. The controlling plate or actuating electrode 33 is connected to a source of charging voltage through the conductor rod 45 and screw 36. When the voltage applied corresponds to the air gap distance 44, as for example 1000 volts for an air gap of .3 mm., the switching plate 23 is attracted to the controlling plate 33, whereby the normally closed contact between the contact screw 49 and the switch contact 30 is opened, and, the normally open contact between contact screw 50 and the switch contact 31 is closed. When the controlling plate 33 has been discharged to a certain value, as for example to 900 volts, the switching plate 23 returns to its initial position as shown in Fig. 1, by means of the inherent resiliency or spring force of the metal switching plate plus the sum of the magnetic forces. The movement of the switching plate 23 is limited by the contact screws 49 and 50, as desired.

The magnetic return device coacts with the switching plate 23 to change the natural slow return motion or movement of the switching plate 23 into a snap action motion, and to make the switching movement independent of changes in the charging voltage. The return forces acting on the switching plate 23 may thus be regulated by means of the adjustable pole screws 78 and 79. As best seen in Fig. 1, the front end of the switching plate 23 extends between the pole screws 78 and 79 and does not touch or engage them at any time. If the pole screws 78 and 79 are adjusted relative to the switching plate 23 when it is in the neutral position, as shown in Fig. 1, so as to make the magnetic return forces on each side of the plate 23 approximately equal, but larger than the spring force of plate 23, plate 23 will be in a state of instability. Under such a condition plate 23 will touch either contact screw 49 or 50 but cannot remain in between these contact screws. Accordingly, by adjusting one of the pole screws as 78 inwardly toward plate 23, a small overbalance of magnetic force can be created, whereby the contact 30 on the plate 23 will engage or be normally closed with the contact screw 49 when the switching plate 23 is in the neutral position as shown in Fig. 1.

When a voltage is applied between the plates 20 and 33 an electrostatic counter force is generated which attracts the plate 23 and overcomes the small magnetic overbalance exerted on the switching plate 23, and the plate 23 will be moved into the equilibrium position between the pole screws, and, the contact screw 50 would be adjusted so that it would be engaged by the contact 31 on the switching plate 23 when this action occurs. When the voltage on the controlling plate 33 decreases below the preadjusted value, the switching plate 23 will switch back into its initial neutral position as shown in Fig. 1, whereby, the plate contact 30 will again close with the contact screw 49. It will be seen that by correctly positioning the pole screws 78 and 79, a very precise and snapping switching movement can be attained. By varying the distance of the pole screws 78 and 79 from the switching plate 23, it is possible to change within a wide range the switching range, the return force and the contact pressure.

The relay of the present invention functions with direct, alternating or high frequency currents. It works with practically no energy consumption if direct current is used. If an alternating current is used, being a capacitor, it will absorb a blind current which increases with the current frequency. It will be seen, that the electrostatic relay of the present invention differs from an electromagnetic relay basically in its mode of operation and also in its areas of application. Electrically, it is a small highly insulated condenser having a capacitance in the range of from 20 to 40 micromicrofarads. Accordingly, it has an extremely high internal resistance, approximately $10^{17}$ ohms, which makes possible its operation with practically no energy consumption. Similar to an amplification tube provided with negative grids, it can also be used as a voltage sensitive switching element without power consumption of its own. Furthermore, because of its ability to be charged and discharged, it can be used to measure extremely small currents or it can be used as a switching or control element.

The relay of the present invention basically measures quantities of electricity, that is, coulombs, and therefore, it can also be used for additive or subtractive switching circuits. The static relay of the present invention will switch whenever a certain amount of electricity has accumulated or flown off.

The aforedescribed properties of the static relay permits this relay to be used in areas which heretofore were inaccessible to the use of relays. Such previously inaccessible areas include the use in circuits with extremely high internal resistance for controlling very small currents; in circuits with no power consumption of their own, for controlling voltages without power consumption; and, for circuits for controlling quantities of an additive or subtractive nature.

Figure 4:
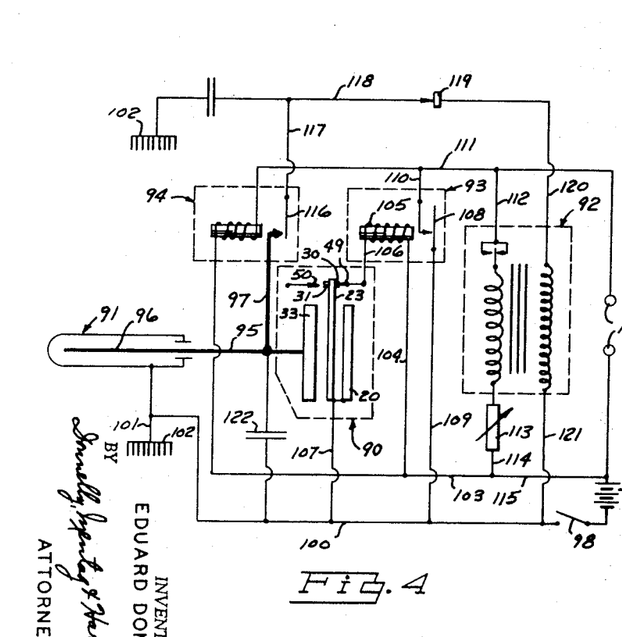
Fig. 4 is a schematic view of a radiation detector incorporating an electrostatic relay of the type shown in Figs. 1 through 3.

Fig. 4 illustrates the application of the relay of the present invention in a novel measurement, alarm, or indicating instrument for rays of almost the entire range of the spectrum, from cosmic rays to infra red rays, however, in particular for alpha, beta and gamma rays. The device of Fig. 4 is an example of the application of the relay for controlling a circuit with extremely high resistance with extremely small currents. Almost all known kinds of ray detectors have very high internal resistances and very high voltages, for instance ion chambers, Geiger tubes, and photocells with high vacuum. These working conditions have been very difficult to control with the methods currently in use and are an ideal area of application for the static relay of the present invention.

In Fig. 4, the numeral 90 indicates a static relay of the type shown in Figs. 1 through 3, and numeral 91 indicates a ray detector, for instance an ion chamber. The detector device of Fig. 4 further includes a unit vibrator transformer, generally indicated by the numeral 92, a working electromagnetic relay, generally indicated by the numeral 93 and a charging electromagnetic relay, generally indicated by the numeral 94. The heavy line 95 is highly insulated and connects the controlling plate 33 of the relay 90 to the anode 96 of the ray detector 91. The heavy line 97 is also highly insulated and connects the line 95 to the contact of the charging relay 94. The rest of the lines in the circuit of the detector device are normally insulated.

The ray detector device of Fig. 4 is actuated by closing the contact switch 98 which closes the contacts of the working relay 93 through the normally closed contacts 30 and 49 of the static relay 90. The battery 99 is thus connected through the switch 98 and the lines 100 and 101 to ground 102. The circuit which is completed by the closing of switch 98 to close the contacts of the working relay 93 is completed from one terminal of the battery 99 through the lines 103 and 104, the relay coil 105, line 106, static relay contacts 30 and 49, the switching plate 23, and thence through the lines 107 and 100 and the switch 98 back to the other terminal of the battery 99. The energizing of the working relay coil 105 closes the contact switch 108 to complete a circuit through transformer 92 by means of the lines 100, 109, 110, 111, 112, 114, 115 and the variable resistance 113. The coil of the charging relay 94 is also simultaneously energized through the lines 103 and 111 since this coil is in parallel with the transformer 92. When the charging relay 94 is thus energized, the contact switch 116 thereof closes to create a circuit to conduct direct current created by the transformer 92 and the rectifier 119. This charging circuit can be traced as follows, in Fig. 4: the controlling plate 33 of the static relay 90 is connected to the lines 95 and 97, the relay contact 116, and the lines 117 and 118 to the rectifier 119 which is in turn connected by the line 120 to the secondary coil of the transformer 92 and the other end of this secondary coil is connected by the lines 121, 100 and 107 to the fixed plate 20 of the static relay 90.

At a predetermined voltage, adjustable at the static relay 90, for instance 1000 volts, the static relay 90 disrupts the circuit through the working relay 93 and thereby opens all the other circuits. The most highly insulated relay contact of relay 94 is thus opened so as to separate the other normally insulated parts from the most highly insulated measuring units, that is, the ion chamber 91 and the static relay 90. At this time the measurement proper begins.

The quantity of electricity stored in the capacitance of the measuring unit, that is, the static relay 90, begins to flow off via the ion current of the ion chamber 91. The amount of ion current is dependent on the intensity of the rays to be measured. When the voltage has dropped to a certain value, similarly predeterminable by the static relay 90, for instance 900 v., the static relay plate 23 again closes the contacts 30 and 49 to close all the aforementioned circuits for all the other components of the system, until at 1000 volts it is again moved from the neutral position thus starting another period of measurement. The larger the ion current, the quicker the discharge of plate 33 and thus the shorter the time interval between two charging impulses. Thus the length of time between two charging impulses becomes a measure of the intensity of the rays. Depending on the kind and intensiy of rays this can vary from seconds to days. By adding a properly dimensioned condenser as 122 the span of time can be prolonged so that optimum conditions can be achieved for all kinds of measurement. Contacts 123 are used for connecting the ray detector of Fig. 4 with transmitters, registering or signalling instruments or the like.

During the entire time between 2 charging impulses, that is during the period of measurement proper, there is no discharge of current from the battery 99. The charging impulses which last but a fraction of a second also practically do not discharge the battery 99 at all.

The possibility to build up simple and inexpensive instruments which are extremely thrifty in consuming current is an important advantage of the static relay of the present invention. Devices of the type shown in Fig. 4 until now could only be built with the use of tubes which use current during the entire working period plus a "readiness" period.

By enlarging the basic circuit shown in Fig. 4 the following instruments can be built: Battery powered control-and-far-distance-measurement instruments for all kinds of rays at inaccessible places such as on a satellite, in the Arctics, on high mountains, on buoys on or below the surface of the sea. A transmitter, for instance, built with transistors connected with contacts 123 would emit a signal during the brief charging impulses. The length of pauses between the various signals would be a measure of the rays or other variable to be measured. An instrument of this kind on a satellite would be able to send signals for years.

Distributing many instruments of this kind over large inaccessible areas, for instance the Arctic zone, would enable a central observation station to receive information regarding weather conditions, radio activity of the air, and the like for a long time.

Another most important application of the static relay of the present invention is the regulating or control of voltage without any power consumption in instruments or circuits which cannot afford any power loss.

For various purposes there has been a great increase in the demand for small high tension instruments which are portable and battery powered. Such an instrument cannot afford any loss of power. Such an instrument is easily obtainable by means of the circuit shown in Fig. 4. The condenser 122 is adapted to serve as a storage condenser and becomes the source of voltage for the using instrument in such a case. The static relay 90 would take care of keeping the voltage within predetermined limits without consuming any power.

A working embodiment of a small battery powered 1000-volt static relay for use with a Geiger tube works with a charge-impulse current of 200 ma. (6 v.) at an impulse duration of approximately ¼ second. The periods without current between two charge impulses last up to two hours. The static relay working embodiment maintains a voltage between 950 v. and 1000 v.

In some cases in the use of the device of Fig. 4, the rectifier 119 and the charging relay 94 can be replaced by "Funkenstrecke" (sparks travelling over a certain distance). Also a corona rectifier has been used successfully, especially at voltages over 2000 volts and this permits a substantial simplification of the device.

The instrument of Fig. 4 may be adapted to operate as a "current thrifty" timing relay by substituting a very high resistance for the ion chamber 91 and adjusting the condenser 122 to the desired unit of time.

The device of Fig. 4 may be changed into an instrument for measuring temperature, humidity or pressure by substituting for the ion chamber 91 appropriate resistors which vary as a function of temperature, humidity, or pressure.

The instrument of Fig. 4 can also be used for the automatic control of the degree of polymerization in the production of plastics or rubber. The electric resistance of most kinds of plastic or rubber is a function of the degree of polymerization. The resistances are extremely high but are usually within the range of the static relay 90. Experiments in this area have proven successful.

Figure 5:
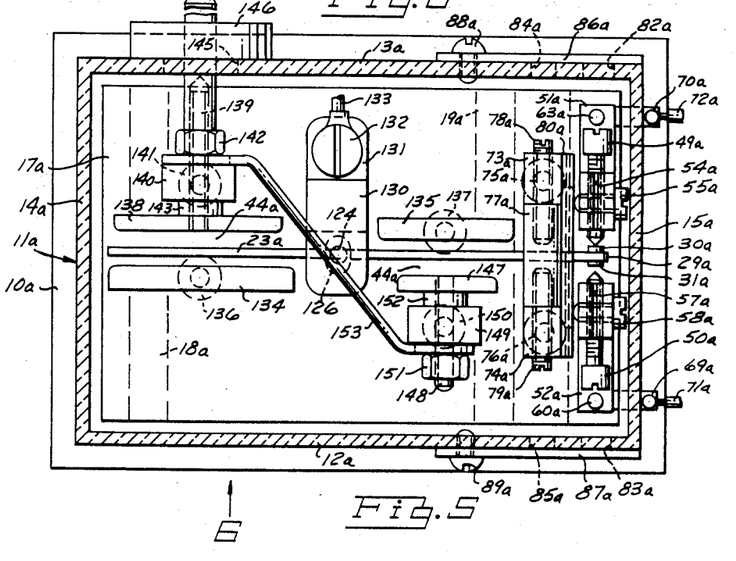
Fig. 5 is a top plan view of a second electrostatic relay embodying the invention, taken along the line 5—5 of Fig. 6, and looking in the direction of the arrows.
Figure 6:
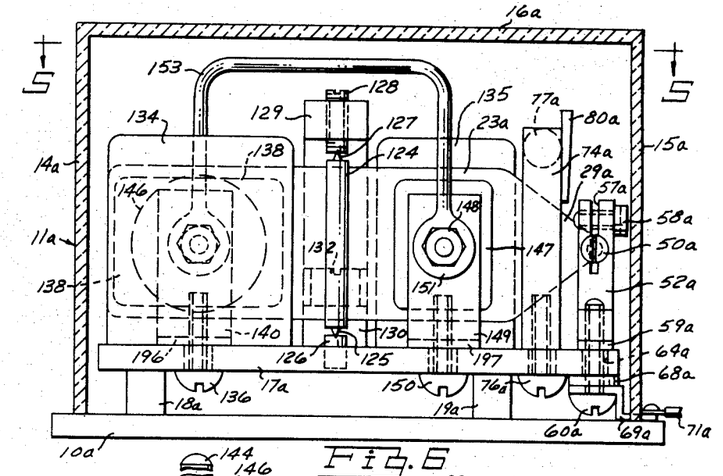
Fig. 6 is a left side elevational view of the structure illustrated in Fig. 5, taken in the direction of the arrow marked 6, and with the side of the transparent cover removed.

Figs. 5 and 6 illustrate a second electrostatic relay made in accordance with the principles of the invention. This second static relay is adapted for applications where the relay may be subject to shock and the like and, for the purpose of reducing the sensitivity to shock and position, this relay includes a balanced switching electrode or plate as more fully described hereinafter. The magnetic return device of this second relay and the contact structure adapted to coact with the contacts on the switching plate are the same as the corresponding structures in the first described static relay. Accordingly, the structure of this second relay which corresponds to the structure of the first described relay has been marked with the same reference numerals followed by the small letter "a." It will be seen that the only structural differences between this second relay and the first described relay is in the switching, fixed and adjustable electroconductive plates as described hereinafter.

As shown in Figs. 5 and 6, the switching plate 23a is pivotally mounted at the center point of the main body portion thereof by means of the vertical shaft or axle 124. The plate 23a is fixedly mounted through a suitable vertical slot in the axle 124 and the lower end of this axle is provided with a pointed bearing member 125 which is adapted to be operatively mounted in the mating bearing member 126 which is fixedly mounted in the grounded base plate 17a. The axle 124 is provided on the upper end thereof with a pointed bearing member 127 which is adapted to be operatively mounted in the mating lower end of the threaded bearing member or screw 128. It will be seen that the axle 124 is thus pivotally supported between the bearing members 126 and 128. The bearing screw 128 is threadably mounted through a suitable aperture in the horizontal arm 129 which projects laterally outwardly from the vertical support member 130 which is provided on the lower end thereof with a similar oppositely disposed horizontal laterally extended foot 131. The vertical support 130 is fixedly secured to the base plate 17a by any suitable means, as by the screw 132 which is also adapted to serve as a terminal post for the ground conductor or wire 133. It will be seen that the plate 23a is formed in the same manner as the plate 23 of the first described relay and that it carries on the front end thereof the same type contacts 30a and 31a.

As shown in Figs. 5 and 6, this second static relay is provided with the two electrodes or fixed metal electroconductive plates 134 and 135 which function electrically the same as the fixed plate 20 of the first static relay. The fixed plate 134 is disposed adjacent the rear end of the switching plate 23a on one side thereof and the fixed plate 135 is disposed adjacent the front end of the switching plate 23a on the other side thereof. The fixed plates 134 and 135 are laterally spaced from the switching plate 23a when it is in the neutral position, as shown in Fig. 5, in the same manner as the fixed plate 20 is spaced from the switching plate 20 of the first described relay. The fixed plates 134 and 135 are secured to the grounded base plate 17a by means of the screws 136 and 137.

The numeral 138 indicates an adjustably mounted controlling or actuating electrode which is fixedly secured to the inner end of the horizontal screw 139 which is mounted through a suitable aperture in the vertical post 140. The post 140 is fixedly secured to the plate 17a by means of the screw 141 and interposed between the post 140 and the plate 17a is a suitable strip of insulation material as 196. The screw 139 is adjustable relative to the post 140 by means of the lock nut 142 and a compressible spacing washer 143 is disposed between the post 140 and the adjustable plate 138. An electrical conductor rod 144 functions the same as the conductor rod 45 in the first described relay 30. As shown in Fig. 5, the inner end of the rod 144 is threadably mounted onto the outer end of the screw 139 and the outer end of the rod 144 projects outwardly of the dust cover 11a through the hole 145. An insulating washer 146 is mounted around the outer end of the rod 144. It will be seen that the adjustable plate 138 is disposed opposite to the fixed plate 134 but on the opposite side of the rear end of the switching plate 23a and is spaced from the switching plate by the air gap 44a.

A second adjustable controlling electrode 147 is disposed oppositely of the fixed plate 135 but on the opposite side of the switching plate 23a and spaced therefrom by the air gap 44a. The adjustable controlling plate 147 is fixed on the inner end of the adjusting screw 148 which extends through a suitable aperture in the support post 149 which is fixedly secured to the base plate 17a by the screw 150. A suitable insulating strip 197 is interposed between the post 149 and the plate 17a. The adjusting screw 148 is adjustable by means of the nut 151 and interposed between the post 149 and the plate 147 is a compressible spacing washer 152. The controlling electrodes 138 and 147 are electrically interconnected by means of the connecting wire 153.

In use, the static relay of Figs. 5 and 6 functions in the same manner as the first described static relay. As shown in Fig. 5, the switching plate 23a is in the neutral position and when the adjustable controlling plates 138 and 147 are charged by a voltage, the plate 23a will pivot clockwise as viewed in Fig. 5 so as to break the contact between contacts 30a and 49a and make the contact between 31a and 50a.

Figs. 7 through 11 illustrate a third electrostatic relay made in accordance with the principles of the invention. This third static relay is provided with a similar magnetic return means and circuit making and breaking means as the first two described relays. However, in this third relay, the magnetic return means is disposed on the outer side of the circuit contact means instead of on the inner side as in the first two relays. The structure of this third relay which corresponds to the structure of the first described relay is marked with the same reference numerals followed by the small letter "b." This third relay contains a plurality of movable balanced electrodes which are connected in an electrical parallel circuit and which are adapted to be turned into the spaces between a plurality of fixed and highly insulated electrodes. This third static relay functions in the same manner as a parallel plate condenser variable by turning the movable set of electrodes or plates. In this third static relay the axle which carries the movable electrodes also carries an arm which carries the contacts for the circuit controlling structure and coacts with the magnetic return mechanism, as more fully described hereinafter.

Figure 7:
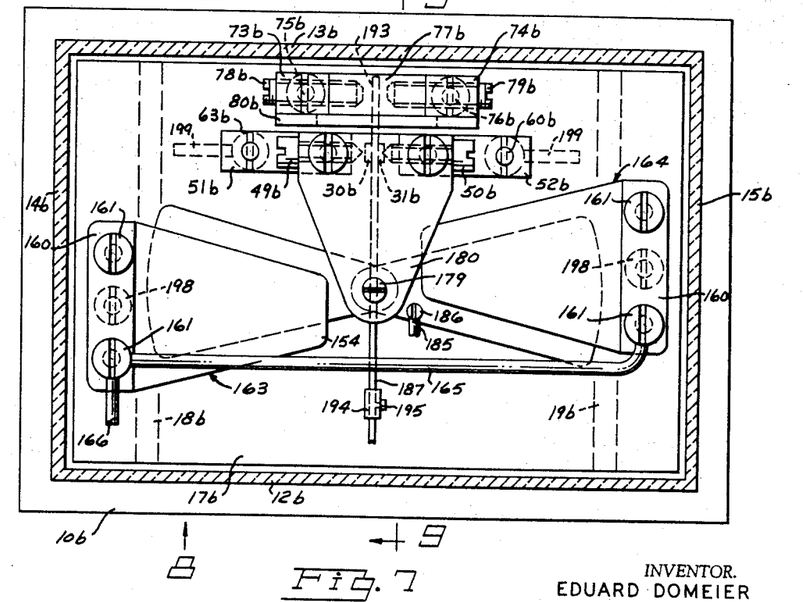
Fig. 7 is a top plan view of a third electrostatic relay embodying the invention, taken along the line 7—7 of Fig. 8, and looking in the direction of the arrows.
Figure 8:
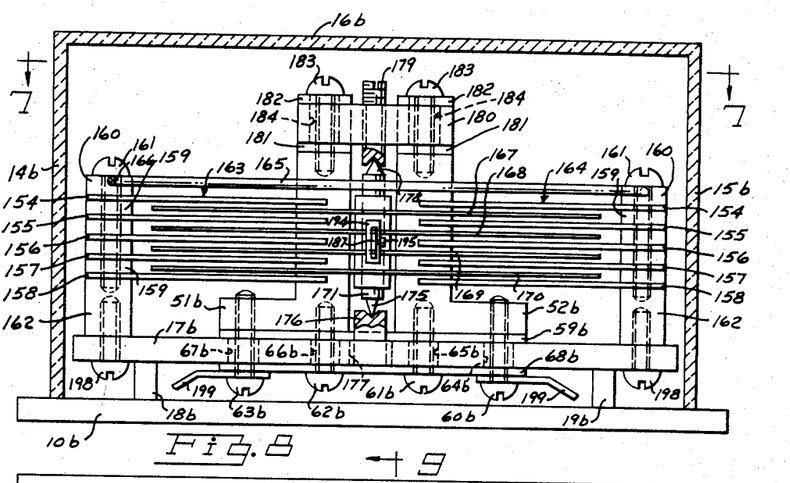
Fig. 8 is a left side elevational view of the structure illustrated in Fig. 7, taken in the direction of the arrow marked 8, and with the side of the transparent cover removed.
Figure 9:
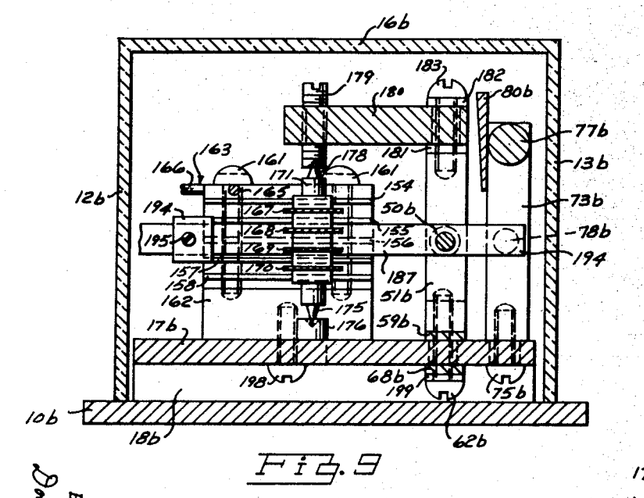
Fig. 9 is an elevational sectional view of the structure illustrated in Fig. 7, taken substantially along the line 9—9 thereof, and looking in the direction of the arrows.

As best seen in Figs. 7, 8 and 9, this third static relay includes a pair of oppositely disposed sets of fixed electro-conductive plates, generally indicated by the numerals 163 and 164, and the structure of each of these sets of fixed plates is marked with similar reference numerals since they are identically constructed. As shown in Figs. 7, 8 and 9, each fixed plate set comprises a plurality of horizontally disposed electroconductive plates 154, 155, 156, 157 and 158 which are vertically spaced apart by means of the metallic conductive spacer members 159. These fixed plates are fixedly secured by means of the metallic conductive pressure plate 160 and the screws 161 on the top of the vertical support bar 162 which is made from a suitable non-conductive or insulating material. The vertical bar 162 is fixedly secured to the base plate 17b by means of the screw 198. The two sets of fixed plates 163 and 164 are electrically connected in parallel by means of the connecting wire 165.

As shown in Figs. 7 through 11, this third static relay includes a plurality of electrically connected pivotally mounted, horizontally disposed, vertically spaced apart balanced electrodes or electroconductive plates 167, 168, 169 and 170 which are carried on the vertical axle or shaft 171. The shaft 171 is disposed at the intermediate point between the sets 163 and 164 of fixed plates, and this shaft is adapted to support the movable balanced plates at the central portions thereof.

The plates 167, 168, 169 and 170 are vertically spaced apart and electrically connected in parallel by the electro-conductive washers or spacers 172, and these plates and washers are fixedly secured in place on the shaft 171 by any suitable means, as by the threadably mounted retainer lock nuts 173 which are fixed in place by the retainer screws 174. The nuts 173 and spacers 172 would be made from a suitable conductive material. The lower end of the shaft 171 is provided with the pointed end 175 which is adapted to be pivotally seated in the mating bearing member 176 which is fixedly mounted in the base plate 17b. The upper end of the shaft 171 is provided with the pointed end 178 which is adapted to be pivotally seated in the lower end of the mating bearing screw 179. The plates 167, 168, 169 and 170 and shaft 171 are to act jointly as one of the two electrodes of the condenser, and are therefore electrically connected.

The bearing screw 179 is threadably mounted in the front end of the horizontal supporting arm 180 and this arm is fixedly mounted on the upper end of the vertical portion of the contact support bars 51b and 52b, as best seen in Figs. 7, 8 and 9, by means of the insulating washers or spacers 181 and 182 and the screws 183. The screws 183 pass through the enlarged holes 184 in the supporting arm 180. The movable plates 167, 168, 169 and 170 may be connected by any suitable means to a charging voltage, as by one of the plates having a conductor as 185 connected thereto as by the screw 186, and, these conductors would be connected in parallel to the voltage.

Figures 10, 11:
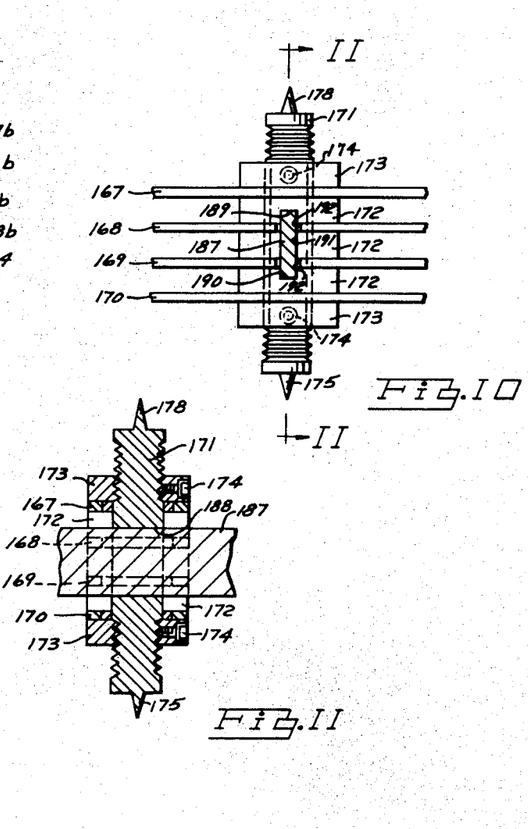

The contact carrier or switching plate 187 is made from a metal of the type described hereinbefore for the switching plate 23 and is grounded to the non-magnetic plate 17b through the shaft 171. The switching plate 187 may be connected to the shaft 171 in any suitable manner. As shown, the switching plate 187 passes through the slot 188 in the shaft 171, the slots 189 and 190 in the upper and lower insulating spacers 172, the slot 191 in the central spacer 172, and, the slots 192 in the plates 168 and 169. The outer end 193 of the plate 187 is disposed between the pole screws 78b and 79b and coacts therewith for the magnetic return function in the same manner as the plate front end 29 functions in the first described relay. The switching plate 187 also carries the contacts 30b and 31b. A counterweight 194 is slidably mounted on the rear end of the switching plate 187 and may be secured in an adjusted position by means of the lock screw 195. The conductor terminals 199 are provided for connecting the contact screw supports in a circuit to be controlled.

The static relay of Figs. 7 through 11 operates substantially in the same manner as the first two static relays. As shown in Fig. 7, the switching plate 187 is in the neutral position and the contact 31b is in engagement with the contact screw 50b. The air gaps between the fixed electroconductive plates and the movable electroconductive plates is determined by the charging voltage in the same manner as the air gap 44 of the first two static relays was determined. When a charging voltage is built up on the movable plates, they will be attracted to the stationary plates whereby the movable plates will pivot in a counterclockwise direction as viewed in Fig. 7. When this action occurs, the contact 31 will be opened and the contact 30b will close with the contact screw 51b. When a predetermined amount of voltage has been discharged from the movable plates, these plates will move clockwise and the magnetic return device will function to return the switching plate 187 back to the neutral position. The stationary plates 154, 155, 156, 157 and 158 function as and may be termed the fixed or stationary electrode of the condenser. The movable plates 167, 168, 169 and 170 function as and may be termed the movable or controlling or actuating electrode of the condenser.

The static relay of the present invention may be used in many devices including portable electronic flash apparatus as used in photography work. In such flash apparatus the flash of light for taking a picture is created by suddenly discharging a condenser. Between flashes the condenser is charged from a battery and an electronic tube is used to short circuit the battery when the condenser reaches the charged state. In such a charged state the charging circuit still draws current from the battery. By using a static relay made in accordance with the present invention instead of the electronic tube, the condenser may be cut off from the charging circuit whereby practically no current will be drawn from the battery after the condenser is charged and is in the standby position waiting for it to produce the next desired flash.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims. As for example, instead of the pivoted shafts and their associated bearings as used in the embodiments of Figs. 6 and 8 to support the switching plates, these switching plates may be pivotally supported by means of conventional tension strips.

What I claim is:

1. In a relay device, a first electroconductive means; a second electroconductive means adjustably disposed in a spaced relationship to said first electroconductive means; means for establishing an electrical field between said electroconductive means; a switching plate electrically connected to said first electroconductive means; said switching plate being movably mounted between said electroconductive means; said electrical field operating to move said switching plate relative to said electroconductive means between a neutral first position and an advanced second position; circuit controlling contact means carried on said switching plate responsive to the relative movement of said switching plate and operable at each of said positions; and, a magnetic return means operable on said switching plate to return the same to said neutral first position.

2. The structure as defined in claim 1, wherein: said switching plate is fixedly connected at one end thereof to said first electroconductive means and the other end is swingably movable between said electroconductive means.

3. The structure as defined in claim 1, wherein: said switching plate is pivotally mounted between said electroconductive means; and, each of said electroconductive means includes at least two portions with one portion being disposed adjacent one end of the switching plate on one side thereof, and, the other portion being disposed adjacent the other end of the switching plate on the other side thereof.

4. The structure as defined in claim 1, wherein: said magnetic return means includes a permanent magnet, and, a pair of oppositely disposed adjustable pole means with one pole means disposed on one side of the switching plate and the other pole means disposed on the other side of the switching plate.

5. In a relay device, a fixed electrode means; an actuating electrode means disposed in a spaced relationship to said fixed electrode means; means for establishing an electrical field between said electrode means; a switching plate electrically connected to one of said electrode means so as to have at least a portion thereof responsively moved in one direction from a neutral position when the operation of said electrical field reaches a first predetermined level on said electrode means; contact means carried on said switching plate for disengagement from a first circuit contact and for engagement with a second circuit contact when said switching plate is moved in said one direction; and, a magnetic return means operable on said switching plate to return the same in the other direction back to the neutral position for engagement with said first circuit contact and disengagement with said second circuit contact when the operation of said electrical field on said electrode means decreases to a second predetermined level.

6. In a relay device, a first electroconductive means; a second electroconductive means disposed in a spaced relationship to said first electroconductive means; means for establishing an electrical field between said electroconductive means; a switching plate electrically connected to one of said electroconductive means so as to have at least a portion thereof responsively moved in one direction from a neutral position when the operation of said electrical field reaches a first predetermined level on said electroconductive means; contact means carried on said switching plate for disengagement from a first circuit contact and for engagement with a second circuit contact when said switching plate is moved in said one direction; a magnetic return means operable on said switching plate to return the same in the other direction back to the neutral position for engagement with said first circuit contact and disengagement from said second circuit contact when the operation of said electrical field on said electroconductive means decreases to a second predetermined level; said switching plate being fixedly connected at one end thereof to said first electroconductive means, whereby, when the operation of said electrical field on said electroconductive means reaches said first predetermined level the other end of said switching plate will be attracted to and moved from said neutral position in one direction toward said second electroconductive means to operate said contact means, and, when the operation of said electrical field on said electroconductive means decreases to said second predetermined level said other end of the switching plate will be moved back in the other direction to the neutral position to operate said contact means.

7. In a relay device, a first electroconductive means; a second electroconductive means disposed in a spaced relationship to said first electroconductive means; means for establishing an electrical field between said electroconductive means; a switching plate electrically connected to one of said electroconductive means so as to have at least a portion thereof responsively moved in one direction from a neutral position when the operation of said electrical field reaches a first predetermined level on said electroconductive means; contact means carried on said switching plate for disengagement from a first circuit contact and for engagement with a second circuit contact when said switching plate is moved in said one direction; a magnetic return means operable on said switching plate to return the same in the other direction back to the neutral position for engagement with said first circuit contact and disengagement from said second circuit contact when the operation of said electrical field on said electroconductive means decreases to a second predetermined level; said switching plate being pivotally mounted between said electroconductive means, whereby, when the operation of said electrical field on said electroconductive means reaches said first predetermined level the switching plate will be attracted to and pivotally move from the neutral position in one direction toward said second electroconductive means to operate said contact means, and, when the operation of said electrical field on said electroconductive means decreases to said second predetermined level the switching plate will be pivotally moved in the other direction back to the neutral position to operate said contact means.

8. In a relay device, a first electroconductive means; a second electroconductive means disposed in a spaced relationship to said first electroconductive means; means for establishing an electrical field between said electroconductive means; a switching plate electrically connected to one of said electroconductive means so as to have at least a portion thereof responsively moved in one direction from a neutral position when the operation of said electrical field reaches a first predetermined level on said electroconductive means; contact means carried on said switching plate for disengagement from a first circuit contact and for engagement with a second circuit contact when said switching plate is moved in said one direction; a magnetic return means operable on said switching plate to return the same in the other direction back to the neutral position for engagement with said first circuit contact and disengagement from said second circuit contact when the operation of said electrical field on said electroconductive means decreases to a second predetermined level; said second electroconductive means being pivotally mounted for movement relative to said first electroconductive means, and said switching plate being carried by said pivotally mounted second electroconductive means, whereby, when the operation of said electrical field on said electroconductive means reaches said first predetermined level the second electroconductive means will be attracted to and will pivotally move toward said first electroconductive means and said switching plate will be pivoted from the neutral position in one direction to operate said contact means, and, when the operation of said electrical field on said electroconductive means decreases to said second predetermined level the second electroconductive means will be pivotally moved away from said first electroconductive means and said switching plate will be pivoted back in the other direction to the neutral position to operate said contact means.

References Cited in the file of this patent

UNITED STATES PATENTS

| | | |
|---|---|---|
| 2,419,111 | Bostwick | Apr. 15, 1947 |
| 2,641,664 | Knutson | June 9, 1953 |
| 2,727,108 | Chisholm | Dec. 13, 1955 |